March 27, 1945.　　W. S. KALS　　2,372,430
CAMERA
Filed Aug. 31, 1943

Inventor
William S. Kals,
By McMorrow & Berman
Attorneys

Patented Mar. 27, 1945

2,372,430

UNITED STATES PATENT OFFICE 2,372,430

CAMERA

William S. Kals, Vancouver, British Columbia, Canada

Application August 31, 1943, Serial No. 500,689

1 Claim. (Cl. 95—42)

This invention relates to a camera of the single lens reflex type, and has for the primary object the provision of means for simplifying this type of camera by obviating the customary mirror movement and the disadvantages attached thereto, such as the air turbulence and movement of dust particles incident thereto in the camera, and which have damaging effect on the sensitized material.

Another object of this invention is the provision of a pellicle mirror which at all times remains fixed within the camera to eliminate the air turbulence within the camera and which is capable of admitting part of the light to the sensitized material and reflecting the other part of the light to the groundglass of the focussing hood of the camera when the shutter is opened for either the exposure of the sensitized material or for the focussing of the camera through the lens.

A further object of this invention is the provision of Polaroid filters to prevent light from reaching the sensitized material during the focussing of the camera through the lens or from the groundglass side of the camera, still not interfering with the light reaching the sensitized material during the period of time in which the shutter is open for taking a picture.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a vertical sectional view illustrating diagrammatically a portion of the camera and showing the arrangement of mirror and frosted glass therein and the location of the Polaroid filters.

Figure 1:
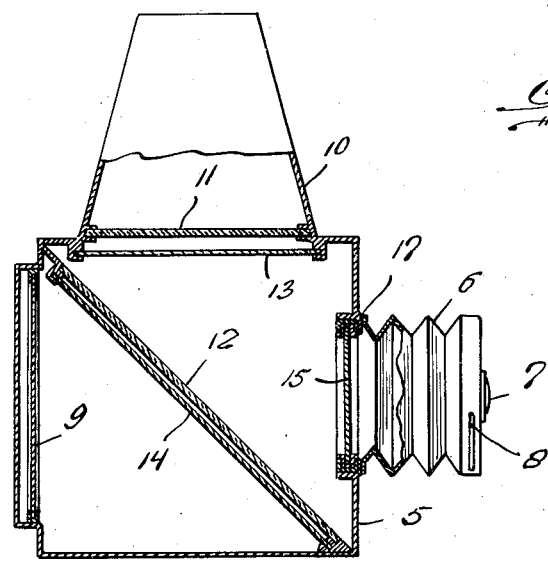

Referring in detail to the drawing, the box or case of a reflex type camera is indicated by the character 5 and 6 the bellows of the lens 7 and shutter mechanism (which is not shown) and of which the operating piece is indicated at 8. The sensitized material in the form of a plate or film is shown at 9. The focussing hood is indicated at 10 and the groundglass thereof by the character 11.

Figure 2:
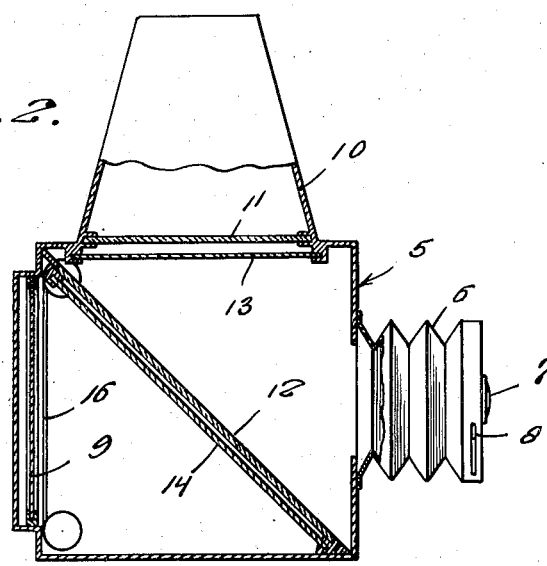
Figure 2 is a view similar to Figure 1 showing a modified form of my invention.
Figure 3:
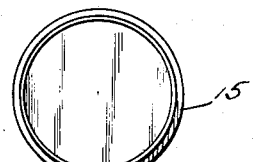
Figure 3 is a plan view illustrating a rotatable Polaroid filter.

In a camera of this type it is customary to employ in the box 5 a movably mounted reflector which, in one position, is adapted to reflect the image by way of the lens to the groundglass and block off the light to the sensitized material and after the camera has been focussed the reflector is moved into a position of exposing the sensitized material to the light admitted through the lens on the operation of the shutter mechanism and to block off the light to the sensitized material from the groundglass side of the box. Said movements of the reflector bring about agitation of air within the box and any particles of dust or other foreign matter that may be in the box is caused to move about and in many instances contacts the sensitized material causing damage resulting in imperfect negatives. To obviate the stated disadvantages the present invention is employed and the reflector is substituted for by a pellicle mirror 12 mounted in the box, as shown in Figures 1 and 2 of the drawing, and fixed against movement. This type of mirror 12 is well known and used extensively in one-shot color cameras and its action is to admit part of the light through the lens when the shutter is open to the sensitized material and reflect the other part of the light to the groundglass 11 of the focussing hood 10. During the focussing of the camera the portion of the light which may pass through the mirror 12 to the sensitized material must be cut off therefrom and after the focussing of the camera, any light from the groundglass side must be prevented from reaching the sensitized material by way of the mirror 12. This is accomplished by Polaroid filters or Pola-screens 13 and 14. The filter or screen 13 is arranged between the groundglass 11 and the mirror 12 while the filter or screen 14 is arranged between the mirror 12 and the sensitized material 9.

The filters or screens 13 and 14 are mounted in the box in any suitable manner and are fixed against movement. Each Pola-screen or Polaroid filter is of a polarizing material in sheet form and is manufactured by the Polaroid Corporation, 168 Dartmouth Street, Boston, Massachusetts. The effect of a Pola-screen or Polaroid filter is to eliminate all light rays except those vibrating in one plane, obviously when a second Pola-screen or Polaroid filter is arranged with its axis of vibration at right angles to the other Pola-screen or Polaroid filter, the light is stopped in either direction. Therefore, it is to be understood that the Pola-screen or Polaroid filters 13 and 14 are arranged accordingly. To prevent the light which passes through the mirror 12 at the time of focussing the camera by way of the lens and through the Pola-screen 14 reaching the sensitized material 9, either a Pola-screen or Polaroid filter 15 is employed between the lens and the mirror 12 or a regular focal plane shutter 16 is employed. The Pola-screen or Polaroid filter 15 is mounted for rotation, as shown at 17, and is made to be rotated by any suitable mechanism (not shown) so that the polarization thereof may be made to parallel the polarization of the screen or filter 14 or to be at right angles thereto and when at right angles thereto, the portion of the light when the shutter mechanism 8 is operated for focussing the camera is prevented from reaching the sensitized material 9. The mirror at this time reflects the light to the groundglass for the focussing purpose. When the polarization of the screen or filter 15 is parallel to the polarization of the screen or filter 14, the light passing through the mirror from the lens may then reach the sensitized material for taking of the picture. When the shutter 16 is employed the screen or filter 15 is not employed and to admit the light through the mirror from the lens to the sensitized material the shutter 16 is opened during taking of the picture. During the focussing period the shutter 16 is closed cutting off the light to the sensitized material permitting the reflector or mirror 12 to reflect the light to the groundglass.

Thus it will be seen from the foregoing description and accompanying drawing, that the necessity of employing a movable reflector or mirror in a reflex camera has been eliminated through the use of the present invention and that the latter gives complete control of the light within the box of the camera during both the focussing stage as well as the stage of exposing the sensitized material for picture taking.

While I have shown and described the preferred embodiment of my invention, it will be understood that minor changes in construction, combination and arrangement of parts may be made without departing from the spirit and scope of the invention as claimed.

Having thus described my invention, what I claim is:

In combination with a reflex camera including a box for the support of sensitized material and a lens to admit light to said box and material and a normally open focussing hood having a groundglass, a non-movable pellicle mirror for admitting a portion of the light from the lens to the sensitized material and for reflecting the other portion of the light to the groundglass, a Polaroid filter arranged between the mirror and the groundlass, a second Polaroid filter between the mirror and the sensitizefd material and having its polarization arranged at right angles to the polarization of the first-named filter, and a third Polaroid filter rotatably mounted in the box between the lens and mirror and adapted to have its polarization moved to parallel with and to be arranged at right angles to the polarization of the second-named Polaroid filter.

WILLIAM S. KALS.